United States Patent [19]
Morimoto et al.

[11] Patent Number: 5,965,881
[45] Date of Patent: Oct. 12, 1999

[54] SCANNING PROBE MICROSCOPE AND PROCESSING APPARATUS

[75] Inventors: Takafumi Morimoto, Ibaraki-Ken; Ken Murayama, Tsuchiura; Sumio Hosaka, Tokyo, all of Japan

[73] Assignee: Hitachi Construction Machinery Co., Ltd., Tokyo, Japan

[21] Appl. No.: 08/969,562

[22] Filed: Nov. 13, 1997

[30] Foreign Application Priority Data

Nov. 14, 1996 [JP] Japan ..................... 8-318637

[51] Int. Cl.⁶ .............. H01J 37/28; G01B 21/30
[52] U.S. Cl. ............. 250/234; 250/306; 73/105
[58] Field of Search ................. 250/234, 235, 250/306, 307; 73/105

[56] References Cited

U.S. PATENT DOCUMENTS

| | | | |
|---|---|---|---|
| 5,001,409 | 3/1991 | Hosaka et al. | 318/592 |
| 5,260,572 | 11/1993 | Marshall | 250/307 |
| 5,329,808 | 7/1994 | Elings et al. | 250/307 |
| 5,388,452 | 2/1995 | Harp et al. | 250/307 |
| 5,448,399 | 9/1995 | Park et al. | 359/372 |
| 5,714,831 | 2/1998 | Walker et al. | 310/316 |
| 5,741,614 | 4/1998 | McCoy et al. | 430/30 |
| 5,801,381 | 9/1998 | Flecha et al. | 250/307 |
| 5,805,448 | 9/1998 | Lindsay et al. | 250/307 |

FOREIGN PATENT DOCUMENTS 1-206202  2/1989  Japan.

*Primary Examiner*—John R. Lee
*Attorney, Agent, or Firm*—Fay, Sharpe, Beall, Fagan, Minnich & McKee

[57] ABSTRACT

This scanning probe microscope can accurately obtain information on surfaces of a sample when measuring the sample in a broad range from a slow scanning speed to a fast scanning speed. The scanning probe microscope comprises a cantilever (16) with a probe (15) at its tip, an optical lever mechanism (17,18) for measuring displacement of the cantilever (16), a mechanism for approaching/separating the cantilever against the sample, XY scanning circuit (21), and further comprises a Z axis piezoelectric element (14b) of a tripod for changing the distance between the cantilever and the sample, a control circuit (20) for controlling the distance between the cantilever and the sample to cause a displacement signal s1 obtained from the optical lever mechanism to be identical to a set value s0, and an adder (24) for adding a control signal from the control circuit and a signal based on the deviation between the displacement signal and the set value. The information on the sample surface is obtained from a signal outputted from the adder.

27 Claims, 10 Drawing Sheets

SCANNING PROBE MICROSCOPE AND PROCESSING APPARATUS

BACKGROUND OF THE INVENTION

1. Field of the Invention

The present invention relates to a scanning probe microscope suited for obtaining surface information of samples based on a broad scanning speed range from a low speed to a high speed, and a processing apparatus utilizing the scanning probe microscope.

2. Description of the Related Art

A scanning probe microscope (hereinafter referred to as "SPM") is an instrument used for measuring uneven shapes and the like on a surface of a sample on a level of atom size. In the SPM, its probe with a pointed tip is brought close to the sample for distances on the order of nanometers (nm), and physical interactions such as an atomic force between the probe and the sample is detected. A force microscope included in a group of the SPMs, which is typically represented by a scanning atomic force microscope (hereinafter referred to as "AFM"), is an instrument used for measuring the uneven shapes (concave and convex shapes) on the surface of the sample by using a beam with a very low spring constant called "a cantilever" and detecting a displacement of the cantilever caused by its flexural deformation. This flexural deformation is produced by an atomic force between the probe disposed at a tip of the cantilever and the sample.

A typical configuration of main mechanical members and a control system for a conventional AFM will be described with reference to FIG. 13. The AFM is a general type of a contact mode. When measuring the shapes of the surface in the sample, the AFM operates as described below:

A displacement generated in a cantilever 82 having a probe 81 at a tip thereof is measured by means of an optical displacement detector called an optical lever mechanism which includes a laser source 83 and a photodetector (a position detector) 84. The optical lever mechanism has been known generally and widely as a mechanism for detecting the displacement of the cantilever in the AFM. Further, a tripod 85 is equipped with three piezoelectric elements 88a and 88b (a Y axis piezoelectric element is not shown) in directions along three axes (X, Y and Z axes: They are perpendicular to one another) which support a sample table 87 for mounting a sample 86. The tripod 85 operates as a three-dimensional actuator for scanning the sample by the probe in the X and Y directions and controlling a distance between the probe and the sample (or between the cantilever and the sample) in the Z axis direction.

For measuring for the surface shape of the sample 86, the cantilever 82 equipped with the probe 81 is brought into a specified place by an approaching/separating mechanism (not shown), where an atomic force can act between the sample 86 and the probe 81. At this time, the probe 81 is subjected to the atomic force from the surface of the sample 86 and the cantilever 82 is flexuously deformed, or bent. When the cantilever 82 is flexuously deformed, an operation of the tripod 85 in the direction along the Z axis is controlled by a control circuit 89 so as to cause a deviation signal $\Delta s$ to be zero. The deviation signal $\Delta s$ is defined as a difference between a displacement signal s1 and a set value s0 set in advance. The displacement signal s1, which can be detected by the optical lever mechanism, represents the displacement of the cantilever 82 (the displacement of the probe 81) caused by the flexural deformation thereof. In other words, the displacement of the probe 81 caused by the flexural deformation of the cantilever 82 is controlled so as to be always equal to the set value s0, whereby the probe 81 is maintained in a condition where it is pressed toward the sample 86 with a constant force. When the probe 81 scans the surface of the sample 86 by driving each piezoelectric element of the tripod 85 with an X-Y scanning circuit (not shown) while controlling a force for pressing the probe 81 on the sample with the constant force, a control signal s3 in relation to the Z axis direction changes in correspondence to the uneven shape of the surface of the sample. The change of the control signal s3 represents the information about the uneven shape on the surface of the sample.

A scanning tunnel microscope disclosed by Japanese Patent Application Laid-Open No. 1-206202 may be cited as a related art. A scanning tunnel microscope is generally an instrument which detects the uneven shape of a surface of a sample by measuring a distance between a probe and the sample while utilizing a tunnel current flowing between the probe and the sample, and by controlling the tunnel current so that it is kept constant while the surface of the sample is scanned with the probe. The scanning tunnel microscope described in the above-mentioned literature has a feature of obtaining surface shape information by adding a correcting signal $\Delta Z_2$ to a basic signal $\Delta Z_1$ originally used for obtaining the surface shape information.

The conventional AFM described above has a problem that an operation control in the direction along the Z axis of the tripod 85 cannot follow the uneven shape of the surface, in particular, when a speed for scanning the sample 86 is increased in order to perform a high speed measurement. If the operation control in the Z axis direction cannot follow the uneven shape, it is difficult to obtain accurate information as to the uneven shape. Moreover, in accordance with circumstances about the scanning speed and surface shapes, there are some possibilities that the measurements cannot be performed at all.

Though the AFM described above is the general type of contact mode, the similar problems are posed by AFMs of other modes such as a tapping mode, or the SPMs of other type. In the SPMs of other type, the configuration for obtaining the information about the surface of the sample is almost the same as that of the above-mentioned AFM, except for particular configurations as the instruments and signals used for the detection and control. The SPMs of other type are also configured to detect a mutual action between the probe and the sample, which vary dependently on the distance between them, and to obtain the information about the surface of the sample based on the control signals obtained by scanning the probe or the sample while controlling operations in the Z axis direction so as to keep the mutual action constant. Accordingly, these SPMs also cannot obtain the surface information when the scanning is performed at high speeds where the operation control in the Z axis direction cannot follow the uneven shape of the surface of the sample.

Further, the scanning tunnel microscope disclosed by the literature mentioned above is not equipped with a member such as a cantilever which is deformed dependently on a force, and has a configuration entirely different from that of the instrument for detecting a force such as the above atomic force. Furthermore, the signal $\Delta Z_2$ to be added to the signal $\Delta Z_1$ is used as a correction signal which serves for enabling to obtain the information on the surface of the sample at a high scanning speed. In cases where the operation control cannot follow the uneven shape of the surface and the original signal cannot be obtained in particular, the scanning tunnel microscope can correct a servo error by using the correction signal only when the servo error is included within a specific range. When the servo error exceeds the specific range, however, the scanning tunnel microscope cannot correct the servo error and causes the probe to be broken.

SUMMARY OF THE INVENTION

A primary object of the present invention is to solve the problems described above, or to provide a SPM which is equipped with a force detecting device, and is capable of obtaining surface information of samples by utilizing the force detecting device and a signal take-out circuit when a control by a control circuit cannot follow a change on the surface of the samples. Accordingly, the SPM according to the present invention is capable of obtaining accurate information on the surface of the samples not only at a low scanning speed but also even at a high scanning speed at which the operation control in the direction along Z axis cannot follow, or within a broad range of scanning speed from a low level to a high level.

Another object of the present invention is to provide a processing apparatus utilizing the SPM described above.

For accomplishing the objects described above, the SPMs of the present inventions are configured as described below:

A SPM according to the present invention comprises, as fundamental members, a probe which is supported by a deformable member to be opposed to a sample, a mechanism which changes a relative positional relationship between the sample and the probe, and a detector which detects a force acting on the probe due to a physical variable produced between the probe and the sample. Further, the SPM according to the present invention is characterized in that it comprises a control section which maintains a state variable related to the force acting on the probe at a set value, and an adding section which adds a signal obtained from the control section and a signal generated on the basis of a deviation between the state variable of the probe and the set value, thereby obtaining information on a sample surface from a signal outputted from the adder. An atomic force is a preferable example of the force acting on the probe due to the physical variable mentioned above, but it is not limited to the atomic force. Deformation of the deformable member is utilized as means for detecting the force which acts on the probe. A cantilever is preferable as the deformable member, but it is not limited to the cantilever. When the cantilever is used as the deformable member, the probe is disposed at a tip of the cantilever and opposed to the sample surface in a condition where it is supported by the cantilever. When the probe is subjected to the force from the sample surface, the cantilever is deformed dependently on a magnitude of the force and the state variable of the probe can be obtained by detecting displacement caused by the flexural deformation of the cantilever.

In the configuration described above, the probe is placed so that it receives the force produced due to the physical variable from the sample surface and its position relative to the sample surface is varied in correspondence to the magnitude of the force, and the set value is given so that relative positional relationship between the probe and the samples is maintained in a predetermined condition (condition of setting the force pressing the probe at a predetermined value) by the control section which controls the relative positional relationship. Further, added to the configuration described above is the adding section which adds the signal obtained from the control section to the signal generated by the deviation between the state variable of the probe and the set value. The SPM according to the present invention is configured to obtain surface information of the sample from the signal outputted from the adding section at a stage to display an image of the sample surface on a display section of the SPM. Further, the probe is supported by the deformable member which is flexuously deformed in correspondence to the force acting on the probe and the deformable member is therefore deformed within a deformable range thereof when a force acts on the probe. By utilizing this deformation and combining the adding section which is used for taking out the deviation signal, the SPM according to the present invention is capable of taking out the information on the sample surface even when the operation control of the control section cannot follow the uneven shapes of the sample surface.

The configuration described above can preferably comprise a switching section which sets the control function of the control section in an on condition or an off condition. When the control function of the control section is set in the off condition by the switching section, the SPM is configured to obtain the information on a sample surface only from the signal based on the deviation.

The configuration described above can more preferably comprise a switching section which sets the function to add the signal based on the deviation to the control signal in an on condition or an off condition. When the adding function is set in the off condition by the switching section, the SPM is configured to obtain the information on a sample surface only from the control signal.

The configuration described above can preferably comprise a switching section which sets the control function of the control section in an on condition or an off condition and another switching section which sets the function to add the signal based on the deviation to the control signal in an on condition or an off condition. By operating the switching sections selectively, it is possible to obtain the information on a sample surface from both or either of the signal based on the deviation and the control signal.

The configuration described above can more preferably comprise a displacement meter so that the SPM uses a signal outputted from the displacement meter in place of the control signal.

Explanation will be made of functions of the SPM described above when it uses a cantilever, which has the prove at its tip, as a mechanism for detecting the state variable of the probe, and utilizes the atomic force as the force due to the physical variable. The probe is set in a condition where it is brought close to the sample within a predetermined region to act the force on the probe. At this time, the probe is subjected to the force from the surface of the sample and the cantilever is flexuously deformed (bent). Displacement caused due to the flexural deformation of the cantilever is detected with the position detector, for example, as an angular change of a light beam reflected by the cantilever (an optical lever). While scanning the sample with the cantilever, the control section controls a distance between the cantilever (the probe) and the sample so that displacement of the cantilever is coincident with the set value set in advance. The SPM is configured to obtain the uneven information on the uneven surface of the sample from a sum signal which is obtained by adding the control signal outputted from the control section and the signal based on the deviation between the cantilever displacement signal and the set value. When the cantilever scans the sample at a relatively slow speed and the operation control in the Z axis direction can sufficiently follow the uneven surface, the displacement due to the flexural deformation of the cantilever is maintained in a definite state and the deviation signal between the cantilever displacement signal and the set value, which is included in the sum signal, is kept at 0. Therefore, the SPM can obtain the uneven information on the sample surface on the basis of the control signal associated with the operation control in the direction along the Z axis. As the scanning speed of the cantilever is increased, the operation control in the direction along the Z axis cannot follow the uneven shape of the sample surface sufficiently. In such a case, the uneven surface which cannot be followed by the operation control is detected as the deviation signal between the cantilever displacement signal and the set value. Therefore, the SPM according to the present invention, which uses the sum signal obtained by adding the signal based on the control signal from the control section and the signal based on the deviation between the cantilever displacement signal and the set value, can obtain the accurate uneven information on the sample surface. Further, even when the cantilever scans at a high speed where the operation control in the Z axis direction cannot follow the uneven shape, the SPM can obtain the uneven information on the sample surface on the basis of the deviation signal contained in the sum signal since the probe itself moves up and down along the uneven shape of the sample surface, and the displacement due to the flexural deformation of the cantilever can be detected as a positional changes of a light beam reflected by the cantilever. By configuring the SPM so as to obtain the uneven information on sample surfaces from the sum signal described above, it is possible to obtain accurate uneven information on sample surfaces throughout a scanning speed range from a slow speed where the operation control can follow the uneven shapes to a fast speed where the operation control cannot follow the uneven shapes. Though discussion has been made above only on the fast and slow scanning speeds for considering the following capability of the control, this capability is also dependent on differences of the uneven shapes on the sample surfaces. The uneven shapes having remarkably short periods, for example, cannot be followed with high possibilities by the operation control even at relatively slow speeds. It is needless to say that the SPM according to the present invention is effective for following the uneven shapes in such cases.

The SPM having the configuration described above permits obtaining fine uneven shapes or compositions and other physical variables on sample surfaces. Further, the SPMs are usable not only in the ordinary atmospheric environments but also in vacuum and liquid such as water. The SPMs described above can be used independently or composed as composite instruments in combination with other instruments. The SPMs can be combined, for example, with optical microscopes and instruments utilizing electron beams (concretely, electron microscopes or electron beam processing apparatus). Though the SPMs are instruments which are used originally for observation or measurements, these instruments are of course usable as processing apparatus for machining or processing the surfaces of the samples. When the SPMs are to be configured as atomic force microscopes by utilizing the cantilevers equipped with probes, relationship between the probes and the sample surfaces may be set in a contact mode (always kept in contact condition), a tapping mode (brought periodically into contact) or a non-contact mode (kept in contactless condition).

DESCRIPTION OF THE PREFERRED EMBODIMENTS

Hereinafter preferred embodiments of the present invention will be described with reference to the accompanying drawings.

Figure 1:
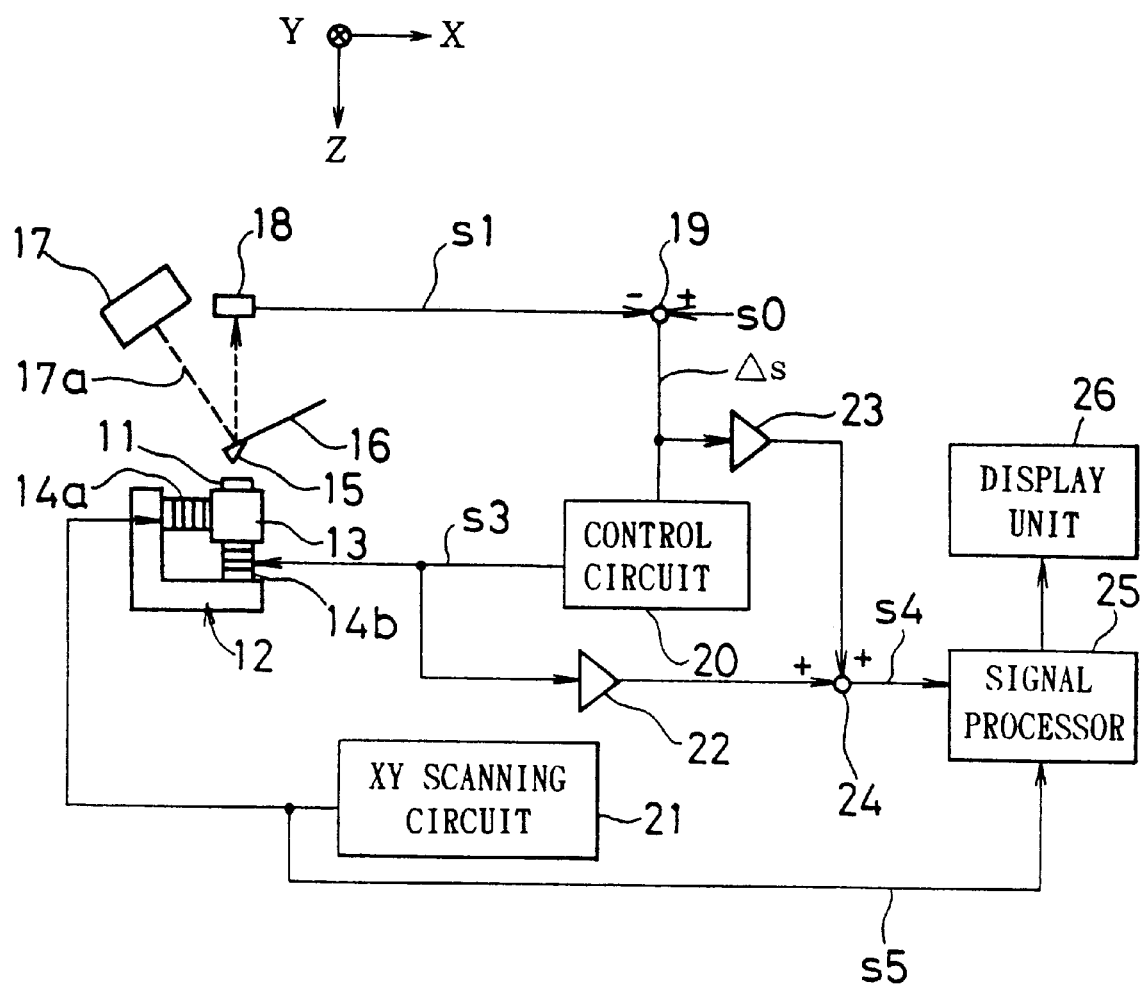
FIG. 1 is a block diagram showing a configuration of a first embodiment of a SPM according to the present invention.

FIG. 1 shows a first embodiment of the SPM according to the present invention. The SPM of the first embodiment is, for example, of a force detection type with a cantilever, and in particular it is an example of an AFM of a contact mode. Displacement caused by flexural deformation (bend) of the cantilever is generally detected by an optical lever mechanism. The cantilever operates as an optical lever of the optical lever mechanism.

In FIG. 1, a sample 11 is mounted on a sample table 13 supported by a tripod 12. The tripod 12 is a three-dimensional actuator equipped with three piezoelectric elements in directions along three axis for moving the sample table 13. The piezoelectric elements includes an X axis piezoelectric element 14a, a Y axis piezoelectric element (not shown) and a Z axis piezoelectric element 14b. The tripod 12 is used for controlling a scanning operation in X and Y directions and a distance between a probe and the sample (or between the cantilever and the sample). Disposed above the sample 11 is the cantilever 16 which is equipped at its tip with a probe 15 opposite to the sample 11. The cantilever 16 makes the optical lever mechanism (an optical displacement detection device) together with a laser source 17 and a photodetector 18. A laser beam 17a emitted from the laser source 17 is reflected on a rear surface of the cantilever 16 and is incident on the photodetector 18. An atomic force acts between a surface of the sample 11 and the probe 15, and the displacement (a shift amount) caused by the flexural deformation of the cantilever 16 in correspondence to the atomic force is measured or detected by the optical lever mechanism.

Then, a configuration of a control system and measuring operations will be described.

In FIG. 1, in order to measure a shape of the surface of the sample 11, the probe 15 is brought near the surface of the sample 11 by a well-known approaching/separating mechanism (not shown) until the atomic force acts between the probe 15 and the sample 11. In this state, the probe 15 is subjected to the atomic force from the surface of the sample and the cantilever 16 is flexuously deformed. The displacement of the cantilever 16 (or the shift amount of the probe 15) can be detected by the optical lever mechanism and is indicated as a displacement signal s1 outputted from the photodetector 18. A subtracter 19 calculates a difference between a set value s0 set in advance and the displacement signal s1, which is a deviation signal $\Delta s$, and this deviation signal $\Delta s$ is supplied to a control circuit 20. The control circuit 20 controls an operation of the tripod 12 in a direction along the Z axis, i.e., the Z axis piezoelectric element 14b. The control circuit 20 outputs a control signal s3 so as to cause the deviation signal $\Delta s$ from the subtracter 19 to become zero. The displacement of the cantilever 16 caused by the flexural deformation thereof is controlled so that the displacement signal s1 is coincident with the set value s0 and the probe 15 is kept to be pressed toward the surface of the sample 11 with a constant force. When the probe 15 scans the surface of the sample 11 based on the operation of the tripod 12 with an XY scanning circuit 21 while causing the pressing force due to the probe 15 to be constant, the control signal s3 in the Z axis direction varies in correspondence to uneven shapes on the surface of the sample 11.

A signal obtained by amplifying the control signal s3 through an amplifier 22 with an adequate gain and a signal obtained by amplifying the deviation signal $\Delta s$ through an amplifier 23 with an adequate gain are added by an adder 24. The adder 24 outputs a sum signal s4 which is inputted into a signal processor 25. The signal processor 25 generates a video signal based on both the sum signal s4 and an output signal s5 given by the XY scanning circuit 21, and displays concavity and convexity (uneven) information about the surface of the sample 11 on a display unit 26 with the video signal. The amplifiers 22 and 23 are used for matching the control signal s3 with the deviation signal $\Delta s$. Namely, though both the control signal s3 and the deviation signal $\Delta s$ represent the uneven information about the surface of the sample, it is impossible to obtain accurate the uneven information only by simply adding the two signals since coefficients for converting these signals into practical heights of the uneven shape are different from each other. Therefore, these signals are amplified with the adequate gains so that they are added after the coefficients for the conversion to the heights are matched with each other.

In this embodiment, the displacement of the cantilever 16 caused by its flexural deformation is maintained in a constant condition and the sample 11 is moved along the Z axis direction so that the cantilever 16 accurately follows the uneven surface of the sample 11 when the sample 11 is scanned at a relatively slow speed by the operation of the XY scanning circuit 21 in the directions along X and Y axes and the operation control in direction along the Z axis sufficiently follows the uneven shape of the sample surface. Accordingly, the control signal s3 accurately represents the uneven information about the surface of the sample 11. The deviation signal $\Delta s$ is kept nearly at 0 at this time, whereby the SPM can perform a measurement similarly to the conventional type instrument and can obtain the uneven information on the surface of the sample.

Figure 2:
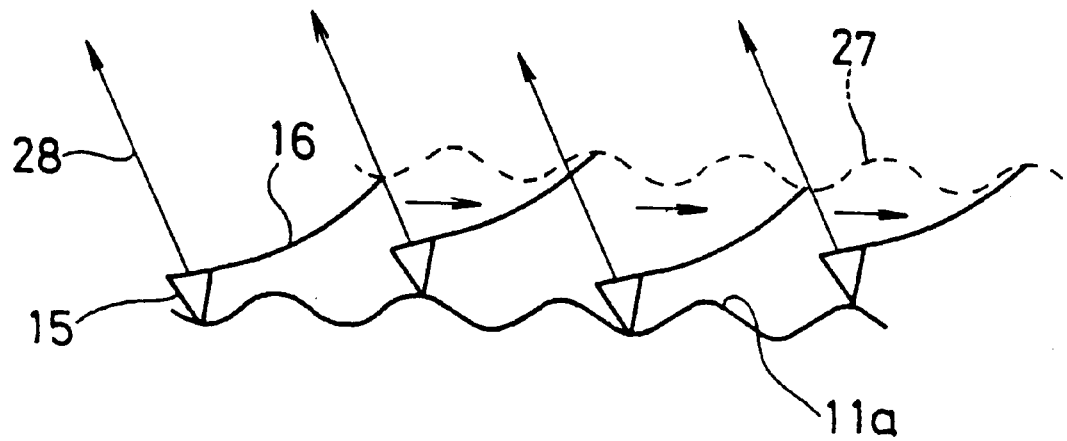
FIG. 2 is a diagram showing a moving condition of a cantilever at a low scanning speed where an operation control follows an uneven surface of a sample.

FIG. 2 shows an operating condition of the cantilever in a case where the cantilever 16 is moved for the scanning in the X-Y direction at a slow speed and the operation control in the Z axis direction follows the uneven shape sufficiently. For convenience of description, FIG. 2 shows an example where the cantilever 16 is moved in the X and Y directions and a vertical position (a position in the Z axis direction) thereof is controlled. Though the example shown in FIG. 2 is different from the configuration where the XY scanning and the operation control in the Z axis direction are performed on a side of the sample 11 as shown in FIG. 1, the example is almost the same as the configuration in a respect that a relativ e positional relationship between the probe 15 or the cantilever 16 and the sample 11 is changeable. When the cantilever scans the surface of the sample at a speed where the operation control in the Z axis direction can follow the uneven shape (concavities and convexities) sufficiently, displacement caused by the flexural deformation of the cantilever 16 is maintained in the constant condition, whereby the cantilever 16 can move so as to accurately follow the uneven shape on the surface 11a of the sample 11. Accordingly, a locus 27 of the cantilever 16 is accurately coincident with the uneven shape on the sample surface 11a. In this case, it is possible to obtain the uneven information on the sample surface 11a based on the control signals used for controlling the vertical position of the cantilever 16. Further, a light beam 28 reflected in the optical lever mechanism for detecting the displacement caused by the flexural deformation of the cantilever 16 is also controlled so as to be at a definite position on the photodetector 18. Accordingly, the deviation signal obtained as the difference between the displacement signal of the cantilever 16 and the set value is maintained to be zero.

If the scanning speed in the X-Y direction is increased to a high level where the operation control in the Z axis direction cannot accurately follow the uneven shape on the sample surface, various conditions are assumed, where the degrees of the following due to the operation control are mutually different dependence on the various scanning speeds. The degrees of the following due to the operation control vary also dependently on the uneven shape of the surface (for example, concavities and convexities at short periods). In such a case, the control signal s3 does not represent accurately the uneven shape on the surface of the sample 11, whereby the deviation signal $\Delta s$ cannot be zero and signal components thereof appear. Although the conventional SPM also can obtain a measured image corresponding to the uneven shape on the sample surface, it is incapable of accurately measuring the actual uneven shape of the sample surface in the conventional SPM since the operation control in the Z axis direction cannot follow the uneven shape completely.

On the contrary, as described above, the SPM of the first embodiment is configured to obtain the measured image by the sum signal s4 substantially composed of the control signal s3 and the deviation signal $\Delta s$, and the tip of the probe 15 is moved relative to the sample 11 while following the uneven shape on the surface of the sample 11. Therefore, the SPM of the first embodiment can obtain the measured image accurately representing the uneven shape on the sample surface. A detailed reason for that is described below.

Figure 3:
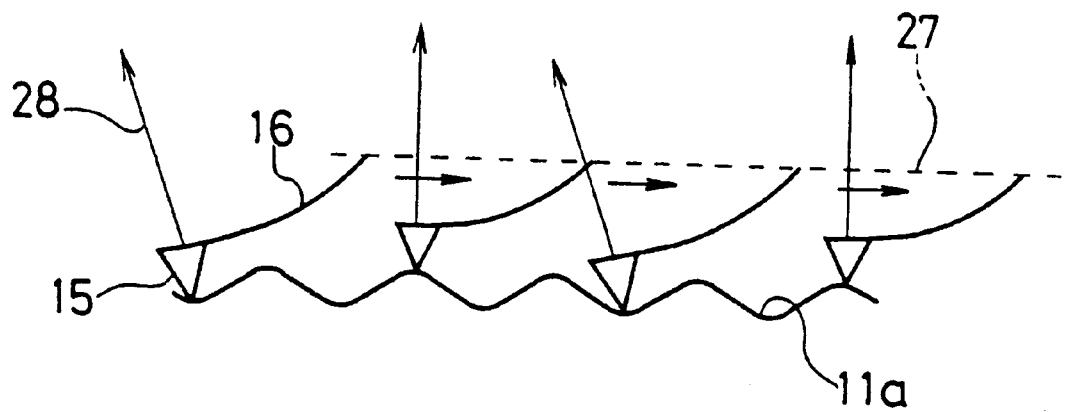
FIG. 3 is a diagram showing another moving condition of the cantilever at a high scanning speed where the operation control can not follow the uneven surface of the sample.

The reason why the SPM of the first embodiment can obtain the measured image accurately representing the uneven shape on the sample surface even at a high scanning speed will be described with reference to FIG. 3. For convenience of description, FIG. 3 shows an example which is similar to that shown in FIG. 2 wherein the cantilever 16 is moved in the X-Y direction and a position of the cantilever 16 in the vertical direction (in the Z axis direction) is controlled. Though the example is different from the configuration wherein the scanning in the X-Y direction and the operation control in the Z axis direction are performed on the side of the sample 11 as shown in FIG. 1, there is no difference in the respect of varying positions of the probe 15 and the cantilever 16 relative to the sample 11.

FIG. 3 shows a movement of the cantilever 16 in a condition where the operation control of the cantilever 16 in the direction along the Z axis cannot follow at all the uneven shape on the surface 11a at a high scanning speed. In this case, the cantilever 16 traces a straight locus 27 as shown in FIG. 3 regardless of the uneven shape on the surface 11a. When the operation control in the vertical direction cannot follow the uneven shape at all, it is impossible to maintain the displacement of the cantilever 16 caused by its flexural deformation at a constant level. However, as shown in FIG. 3, the cantilever 16 moves while being flexuously deformed in correspondence to the uneven shape on the sample surface 11a. Accordingly, the prove itself still has a characteristic that it moves up and down while following the uneven shape on the sample surface 11a though it is impossible to control the vertical position of the cantilever 16 so as to follow the uneven shape.

Accordingly, the displacement of the cantilever 16 caused by the flexural deformation thereof can be detected on the basis of the positional variations of the reflected light beam 28 from the optical lever mechanism as shown in FIG. 3. The deviation signal Δs obtained as the difference between the displacement signal s1 of the cantilever 16 and the set value s0 can be utilized as the signal representing the uneven information on the sample surface 11a.

Since the first embodiment is configured to obtain the uneven information on the sample surface 11a from the sum signal s4 made by adding a signal based on the deviation signal Δs to a signal based on the control signal s3 from the control circuit 20, the uneven information can be obtained from the signal based on the deviation signal Δs to be added, even when the control of the cantilever 16 cannot follow the uneven shape on the sample surface 11a at a high scanning speed and the uneven information cannot be obtained from only the signal based on the control signal, as shown in FIG. 3. When the operation control can follow the uneven shape completely (in the case shown in FIG. 2), the deviation signal Δs comes to be zero and therefore in the first embodiment the usual measurement in a manner quite the same as that of the conventional apparatus can be carried out. Thus, the deviation signal Δs does not give any interference to the usual measurement.

The conventional SPM is incapable of obtaining any uneven information on the sample surface when the scanning operation is performed at a fast scanning speed in the X-Y direction, and the operation control in the Z axis direction cannot follow the uneven shape on the sample surface and therefore the control signal s3 does not vary at all (in a condition where gain is remarkably lowered and signal variations are almost equal to zero in the aspect of a control theory). On the contrary, the SPM of the first embodiment can obtain the measured image accurately representing the uneven shape on the sample surface. Because, in the SPM of the first embodiment, the deviation signal Δs representing the uneven shape on the sample surface is produced by utilizing the movement of the cantilever 16 relative to the sample 11 and the flexural deformation thereof following the uneven shape, and the sum signal s4 which is composed of the deviation signal Δs and the control signal s3 and is used for generating the measured image is outputted from the adder 24.

Further, the operation control in the direction along the Z axis may follow the uneven surface of the sample insufficiently when the scanning speeds of the cantilever 16 is within an intermediate range between the slow and fast scanning speeds. In such a case, the information about the uneven surface which the control cannot follow can be detected by the deviation signal Δs as the difference between the displacement signal of the cantilever 16 and the set value. Accordingly, the SPM in accordance with the first embodiment, which utilizes the sum signal s4 obtained by adding the signal derived from the control signal s3 to the signal derived from the deviation signal Δs, can obtain the accurate information about the uneven surface of the sample. Further, whether or not the operation control in the Z axis direction can follow the uneven surface of the sample is dependent on differences among the uneven shapes of the uneven surfaces. When the uneven shapes have remarkably short periods, for example, the operation control cannot follow them with high possibilities even if in a relatively slow scanning speed. The SPM in accordance with the first embodiment is effective in such cases.

Then concrete numerical values which are to be adopted for the above-mentioned first embodiment will be described. A response frequency band for the operation control in the direction along the Z axis is limited by natural frequencies of mechanical elements such as the tripod 12, frequency characteristics of the piezoelectric elements and the driving circuit, and a frequency characteristic of the control system and so on. When taking measures for improving a response frequency band characteristic for the operation control in the Z axis direction, it is limited by the natural frequencies of the mechanical elements in many cases. Though general discussion on limits of the natural frequencies of the mechanical elements is difficult, the limits lie around several kilohertz and it is remarkably difficult to set the natural frequencies higher than this level. According to the control theory, the control system must therefore be designed so as to have a low gain at a resonance point thereof for preventing its oscillation at the natural frequencies of the mechanical elements. As a result, the response frequency band for the operation control is lower than the natural frequencies of the mechanical elements and limited on the order of 1 kHz. In case of the present embodiment, however, even in a frequency range where the operation control cannot follow the uneven surface of the sample 11, if the cantilever 16 is flexuously deformed and the tip of the probe 15 can follow the uneven shapes of the surface, the uneven shapes can be measured. Cantilevers which are generally used under the present circumstances have mechanical natural frequencies on the order of tens of kilohertz to hundreds of kilohertz which are one to two units higher than the natural frequencies of the mechanical elements used in the control system described above. This means that the SPM of the first embodiment can easily perform measurements at scanning speeds one to two units higher than those of the conventional type.

Figure 4:
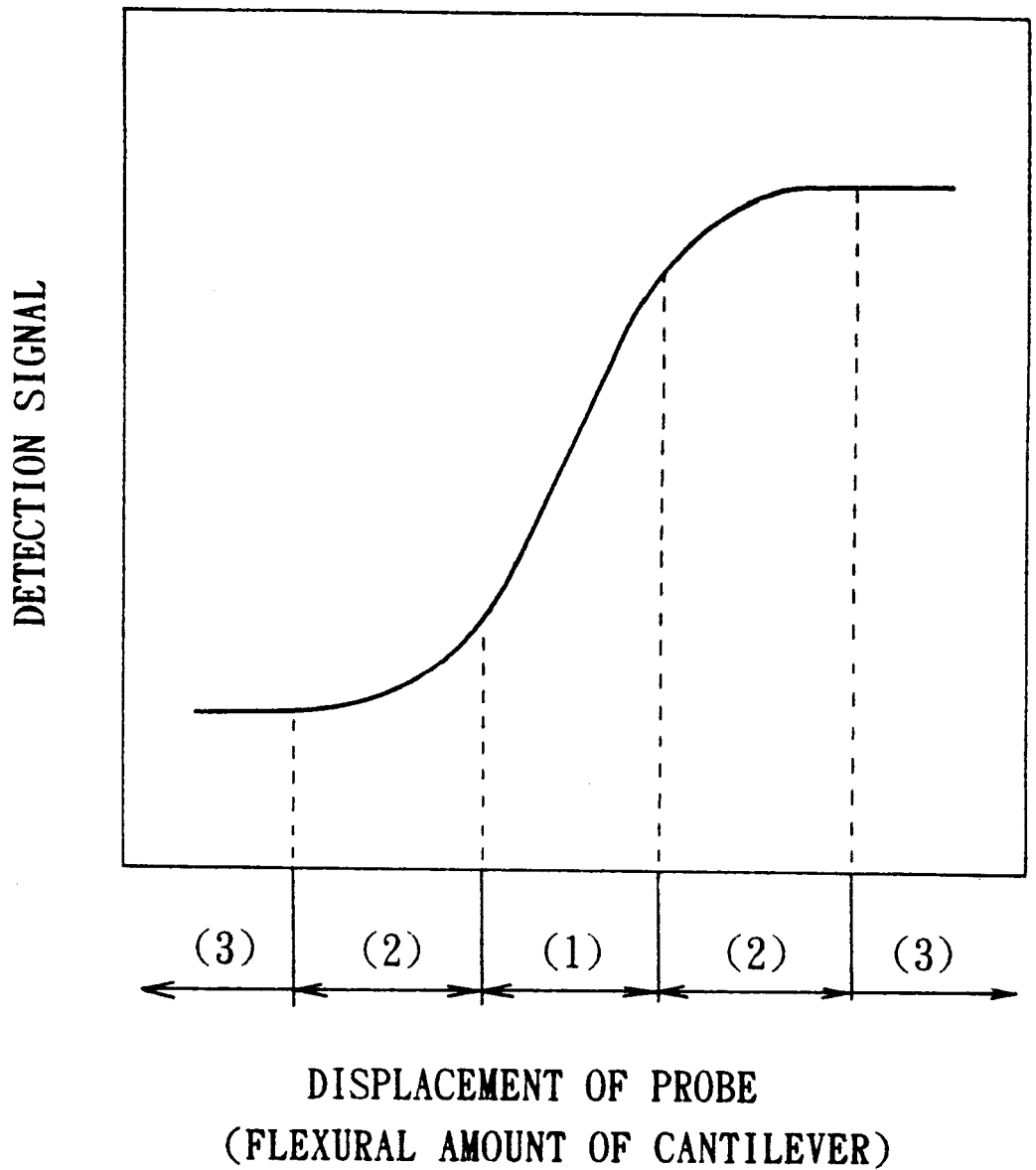
FIG. 4 is a characteristic curve diagram showing relationship between displacement of a probe and a detection signal.

FIG. 4 shows variations of a signal detected by the optical lever mechanism when the cantilever 16 is flexuously deformed. A two-division type photodiode (PD) is used as the photodetector 18 for detecting positions of the light beam reflected from the cantilever 16 (optical lever). (1) is a region wherein a signal detected by the optical lever mechanism varies linearly in proportion to displacement of the probe 15 and the region (1) corresponds to a case that the reflected light beam is incident onto a vicinity of the center of the two-division type PD. (2) is a region wherein the light beam reflected by the cantilever deviates remarkably from the center of the two-division type PD and non-linearity appears in variations of the detection signal relative to the displacement of the probe. (3) is a region wherein the detection signal does not vary regardless of variations of flexure of the cantilever 16 due to limitation in the output voltage of the signal detecting circuit.

The deviation signal (signal as to control deviation) explained in the first embodiment varies as shown in FIG. 4 in accordance with the control deviation of the displacement caused by the flexural deformation of the cantilever 16. Accordingly, it is possible to obtain a detection signal having the linear characteristic relative to the displacement of the probe by performing a measurement within the region (1). For the region (1), it is easy to realize the probe displacement of approximately 1 $\mu$m though its numerical value cannot be discussed generally since it is different dependently on various factors such as an element area of the two-division PD and magnification ratio of the optical lever mechanism. For realizing the linear characteristic in a broader range, it is preferable to use a position sensor diode (PSD).

Though the first embodiment has been described on an assumption of using mainly analog processing circuit systems, the technical effect of the present invention remains unchanged even when the SPM uses or includes digital processing circuit systems. Further, a SPM provided with a computer system for an image processing section, wherein the computer system is used for calculating three-dimensional images, analyzing processing measured data, and displaying or storing the data, is also contained in the scope of the present invention.

Figure 5:
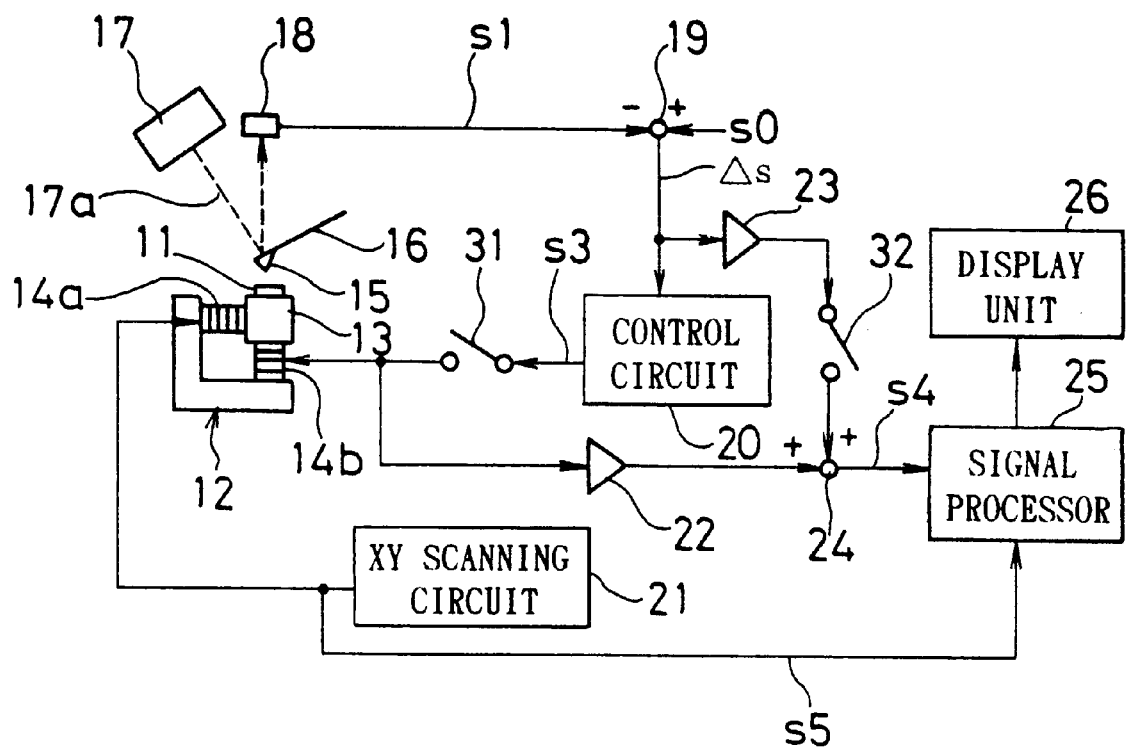
FIG. 5 is a block diagram showing a configuration of a second embodiment of the SPM according to the present invention.

FIG. 5 shows a second embodiment of the SPM according to the present invention. In FIG. 5, elements which are the substantially the same as those shown in FIG. 1 are represented by the same references numerals and will not be described in details. The second embodiment is characterized in that it comprises an element for switching the control function of the control circuit 20 into an on or off condition and an element for switching the function of adding the signal derived from the deviation signal Δs to the signal derived from the control signal s3 into to an on or off condition. The second embodiment remains unchanged from the first embodiment in other configurational respects.

A switch 31 is the element for switching the control function of the control circuit 20, and in the second embodiment the switch 31 actually transfers or cuts off the signal s3 outputted from the control circuit 20. The switch 31 is connected between the control circuit 20 and each of the tripod 12 and the amplifier 22 (or the adder 24). Further, it is possible to obtain a function similar to the action of the switch 31 by utilizing a digital control system for making a function means which invalidates the operation of the control circuit 20 so as to cause the control signal s3 to be zero, or by maintaining the control signal s3 at a constant value without using the detected displacement signal s1.

Further, a switch 32 is the element for switching the function of adding the signal derived from the deviation signal Δs to the signal derived from the control signal s3. In the second embodiment, the switch 32 actually transfers or cuts off the amplified deviation signal Δs.

When the switches 31 and 32 are turned on at the same time, the configuration of the second embodiment is the same as that of the first embodiment, thereby operating and functioning the same as the first embodiment.

In order to perform accurate measurements of vertical sizes, on the other hand, it is necessary to determine a coefficient which is to be used for converting the deviation signal Δs into a vertical size. Speaking concretely, it is necessary to measure a variation characteristic of the detection signal relative to the displacement of the probe 15 as shown in FIG. 4 and it is important in particular to obtain a slope in the linear region (1), or the coefficient used for converting the deviation signal into the vertical size. A measurement for obtaining the result shown in FIG. 4 can be carried out by moving up and down the sample 11 by the tripod 12 and recording variations of the signal from the optical lever mechanism while keeping the probe 15 in contact with the surface of the sample 11. This technique is generally called a focus curve measurement and widely utilized for AFMs. However, this measurement inevitably involves a deviation due to a characteristic of the piezoelectric elements used in the tripod 12. The characteristic of the piezoelectric elements is a nonlinearity of the piezoelectric elements relative to a voltage and known well to those skilled in the art.

Therefore, we utilize a measurement which is carried out with the switch 31 kept off and the switch 32 kept on. In this case, the control to maintain displacement caused by the flexural deformation of the cantilever 16 to be constant is inoperative and the deviation signal Δs represents the uneven shapes of the sample surface. Further, since the operation control in the direction along the Z axis is not carried out, a deviation signal due to the nonlinearity of the piezoelectric elements is not contained in a measured signal. When a surface of a sample which has an accurately known vertical size is measured by the focus curve method described above, the displacement of the probe is coincident with the accurately known sample height, thereby making it possible to know an accurate coefficient which is used for converting the deviation signal on that occasion into a vertical size. It can easily be imagined that the test sample as described above can be available from a semiconductor manufacturing process, and its accurate size can be known by directly observing it through a high resolution microscope such as a scanning electron microscope (SEM).

Next, when the switch 31 is turned on and the switch 32 is turned off, the second embodiment is quite the same as the conventional AFM. The deviation signal Δs becomes 0 and therefore the function for adding the deviation signal to the control signal is apparently inoperative when a scanning speed is slow enough to allow the operation control in the Z axis direction to sufficiently follow the uneven surface. The second embodiment is however effective for measurements in cases where the configuration as to the adding function of the deviation signal comes to be adverse factor or the adding function is desired to be ineffective for evaluating the measurement, in other different instruments and circuits.

Though FIG. 5 shows an example comprising both the switches 31 and 32, it is possible to configure the SPM so as to comprise either of the switches 31 and 32.

Figure 6:
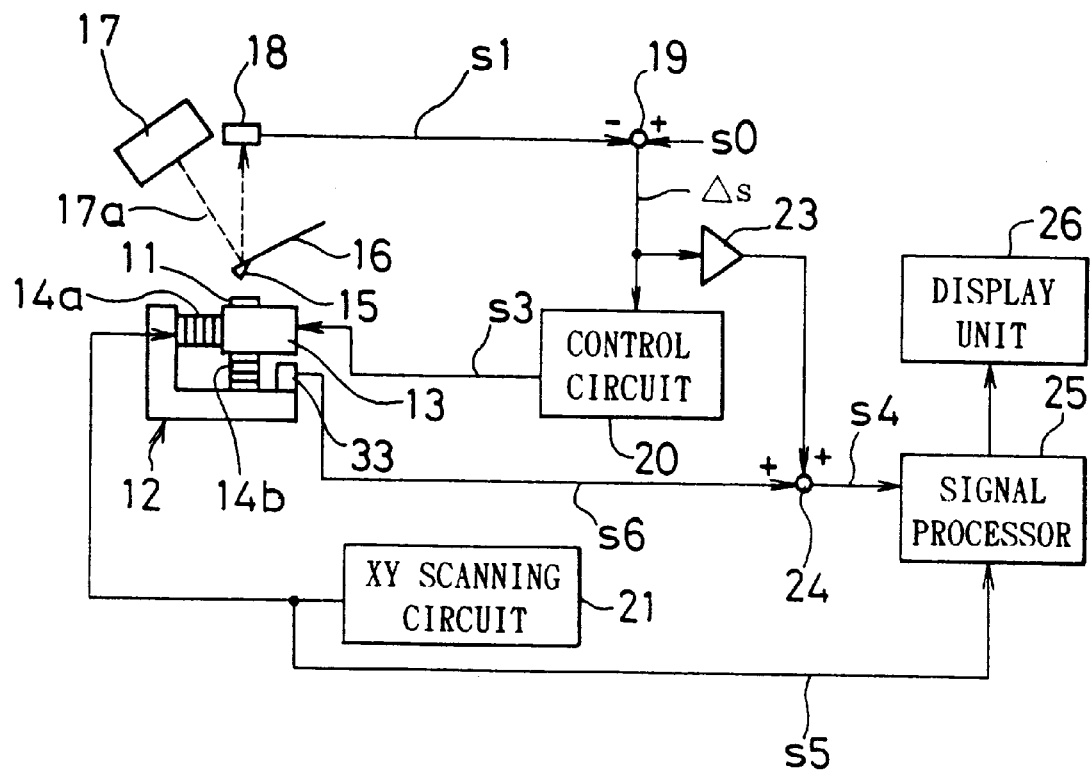
FIG. 6 is a block diagram showing a configuration of a third embodiment of the SPM according to the present invention.

FIG. 6 shows a third embodiment of the SPM according to the present invention. Elements which are substantially the same as those shown in FIG. 1 are represented by the same reference numerals In FIG. 6 and will not be described in details. The third embodiment is characterized in that it comprises a displacement meter 33 which measures displacement of the Z axis piezoelectric element 14b of the tripod 12, or the displacement of the sample table. In the third embodiment, a detection signal s6 outputted from the displacement meter 33 is utilized in place of the control signal s3 described with reference to the first embodiment. In other configurational and operative respects, the third embodiment remains unchanged from the first embodiment. The third embodiment can carry out measurements with an accuracy of the displacement meter 33 and with no influence due to nonlinearity and hysteresis in the piezoelectric elements.

Further, it is possible to measure the uneven shape of the sample surface more accurately when the SPM is equipped with the displacement meter 33 which measures the displacement of the Z axis piezoelectric element 14b, and has a local closed control loop by which the Z axis piezoelectric element 14b displaces accurately relative to the control signal s3. This corresponds to the configuration for measurement described in the first embodiment, i.e., the configuration which uses the sum signal of the control signal and the deviation signal. The third embodiment is expected to have a technical effect which is similar to that of the first embodiment and included within the scope of the present invention.

Figure 7:
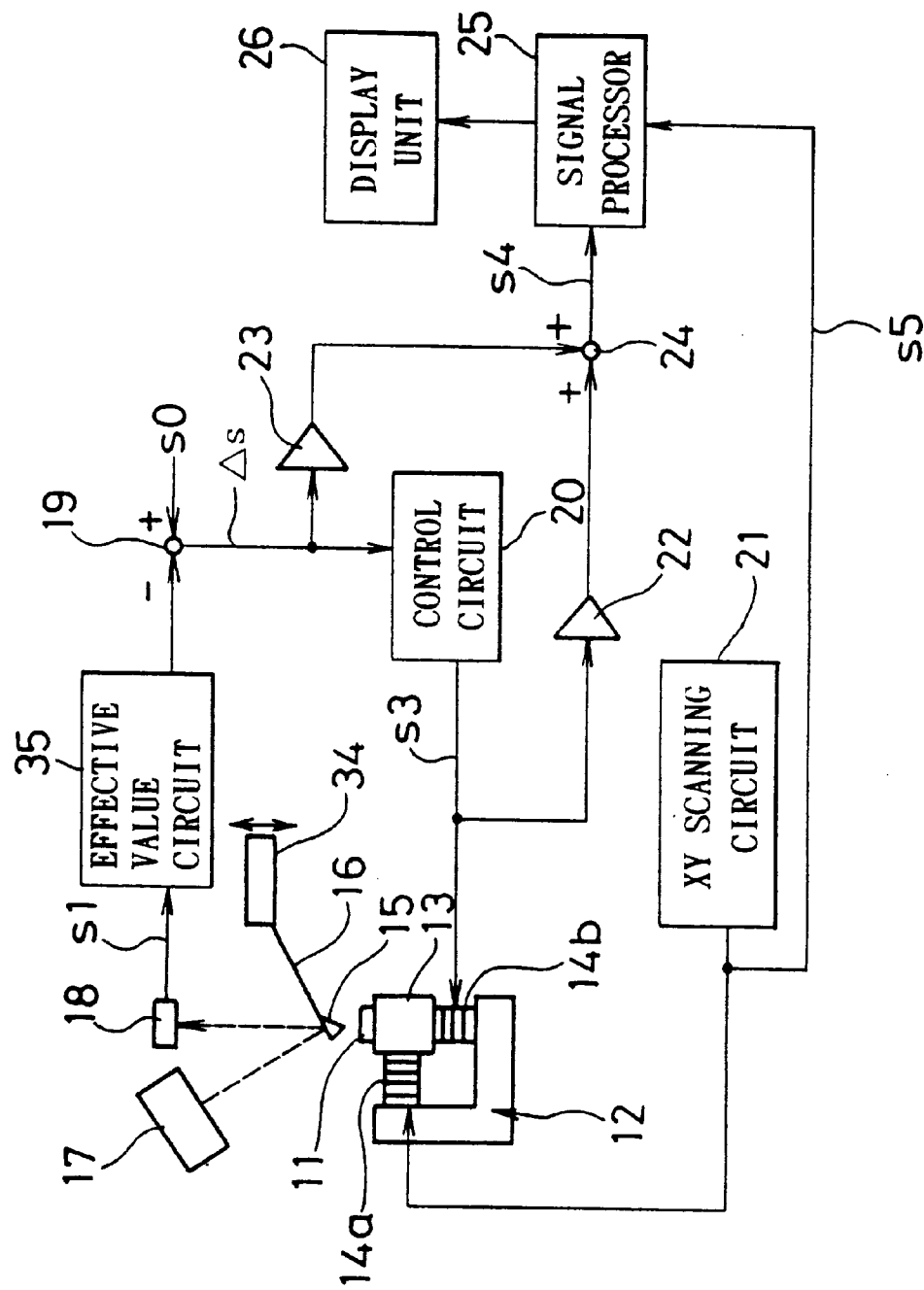
FIG. 7 is a block diagram showing a configuration of a fourth embodiment of the SPM according to the present invention.

FIG. 7 shows a fourth embodiment of the present invention. Elements which are the substantially the same as those shown in FIG. 1 are represented by the same reference numerals and will not be described in details. The fourth embodiment is characterized in that it uses a cantilever 16 of the tapping mode in place of the contact mode in the fundamental configuration adopted for the first embodiment. The cantilever 16 is attached to a tip oscillator 34 which oscillates the cantilever. Accordingly, the cantilever 16 is in an oscillated condition. A displacement signal s1 outputted from the photodetector 18 is converted into an oscillation amplitude signal by an effective value circuit 35. The amplitude signal is input into the adder 19. The fourth embodiment remains unchanged from the first embodiment in other configurational respects. Accordingly, the operation control in the direction along the Z axis of the tripod 12 is performed so as to obtain an amplitude determined by the set value s0.

Figure 8:
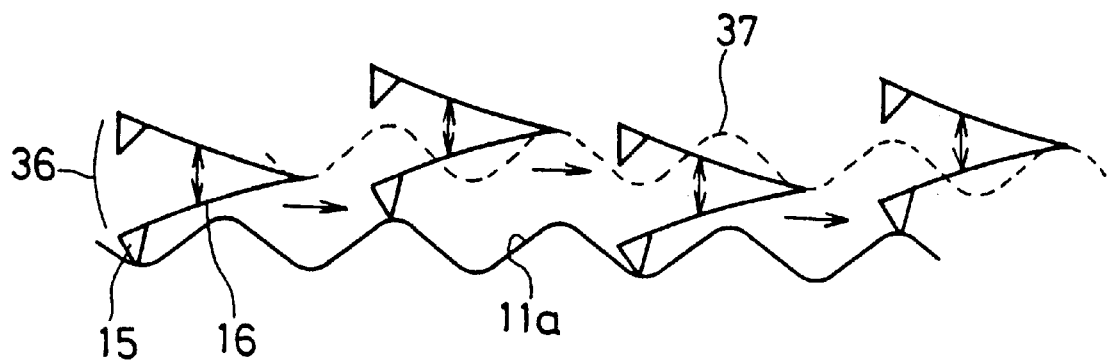
FIG. 8 is a diagram showing a moving condition of the cantilever at a low scanning speed where the operation control follows the uneven surface of the sample.
Figure 9:
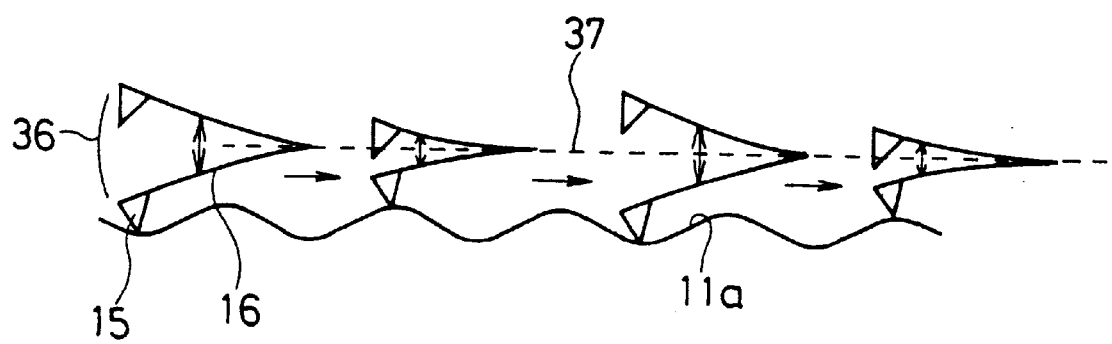
FIG. 9 is a diagram showing a moving condition of the cantilever at a high scanning speed where the operation control can not follow the uneven surface of the sample.
Figure 10:
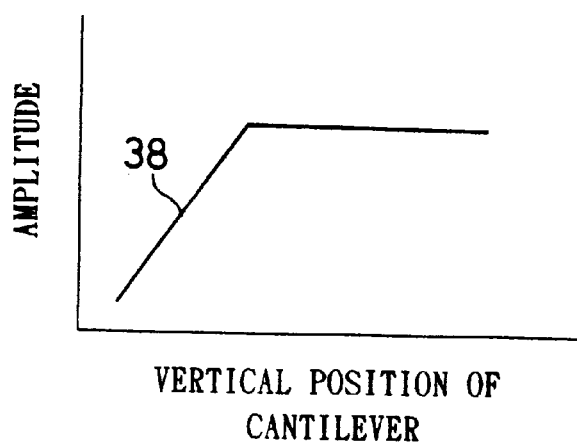
FIG. 10 is a characteristic curve diagram showing a relationship between a vertical position and an amplitude of a cantilever.

FIG. 8 shows a moving state of the cantilever 16 when the operation control can follow the uneven surface at a slow scanning speed. At the slow scanning speed, the cantilever 16 has a constant amplitude 36 and a locus 37 of the oscillated cantilever 16 is controlled so as to be coincident with the uneven shapes of the sample surface 11a. The uneven shapes of the surface 11a of the sample 11 can be known from the locus 37 representing the moving state of the oscillated cantilever 16. FIG. 9 shows a moving state of the cantilever 16 at a fast scanning speed where the operation control cannot follow the uneven surface. At the fast scanning speed, the amplitude 36 of the cantilever 16 varies according to the uneven shapes of the sample surface 11a, whereas the locus 37 of the oscillated cantilever 16 is constant regardless of the uneven shapes of the sample surface 11a. Since a vertical position and an amplitude of the cantilever is set in relationship shown in FIG. 10, it is possible to know the uneven shape of the sample surface 11a by utilizing a linear variation region (a slope section 38 of the graph shown in FIG. 10). The fourth embodiment is also capable of performing measurements, like the embodiments already described above, mainly on the basis of the control signal s3 in the sum signal s4 at a slow scanning speed, mainly on the basis of the deviation signal Δs in the sum signal s4 at a fast scanning speed, and on the basis of the sum signal s4 at an intermediate scanning speed.

Though the optical lever mechanism is used as a mechanism for detecting the flexural deformation of the cantilever in each of the embodiments described above, these embodiments may be modified to use a laser interference method. Further, the tripod for moving the sample is used as a sample scanner in the embodiments, but they may be modified to use, for example, a tube type scanner, or a scanning mechanism for moving the cantilever. Even when the modified embodiments have different scanning mechanisms, they can be expected to have the similar technical effects.

Though the various embodiments described above are the AFMs of the contact mode in which the probe is always kept in contact with the sample surface, or of the tapping mode in which the probe is periodically brought into contact with the sample surface, they may be set in the non-contact mode in which the probe and the sample surface are maintained in contactless conditions.

The characteristic configuration according to the present invention is not limited to the AFMs but is applicable to SPMs of other types, for example electric force microscopes and magnetic force microscopes. Since physical variables utilized for detecting information on the sample surfaces are different among the different types of SPMs, each of the SPM uses a unique mechanism for measuring the sample surface, which is different from the probe and the cantilever of the AFM. However, in order to obtain accurate the surface information of the sample in accordance with a scanning speed having a broad range from a slow speed to a fast speed, the SPM is configured so as to be equipped with means which is substantially equivalent to the control system and the signal take-out system described with reference to the embodiments. Though the configuration which uses the cantilever as deformable member for supporting the probe is described in the embodiments, it is not always necessary to use the cantilever. For example, a cylinder, a diaphragm or a link mechanism may be used as the deformable member which is flexuously deformed in correspondence to a force.

The SPM is ordinarily used in atmospheric environments. Further, the SPM can be used in a vacuum environment by disposing it within a vacuum chamber in a semiconductor manufacturing equipment. Furthermore, the SPM can be used even in a liquid such as water as occasion demands.

As understood from the foregoing description, the SPM according to the present invention, which is configured to obtain surface information of a sample on the basis of the sum signal obtained by adding the signal based on the deviation between displacement of the probe and the set value to the control signal outputted from the controller, is capable of obtaining accurate information of the uneven shape of the sample surfaces at each of the slow scanning speed, the fast scanning speed where the control for the position of the probe cannot follow the uneven shape, and the intermediate scanning speed. The SPM of the present invention can increase a scanning speed one or more than two units higher in comparison with the conventional SPMs.

The configuration according to the present invention can have a technical effects not only for obtaining the information on uneven shapes but also detecting other physical variables, for example, magnetism distributions on the sample surfaces with the magnetic force microscopes and electric field distributions on the sample surfaces with the electric force microscopes.

The SPM of the present invention can be used independently or combined with another instrument to form a composite apparatus. An optical microscope or an instrument utilizing an electron beam can be mentioned as the instrument to be combined with the above-mentioned SPM.

The instrument utilizing an electron beam is, for example, the electron microscope or an electron beam processing apparatus. Though the SPM is originally an instrument for observation or measurement, it is usable also as an apparatus which performs machining and processing on the sample surfaces. Such machining and processing is performed, for example, on wafers formed by integrating semiconductor elements.

Figure 11:
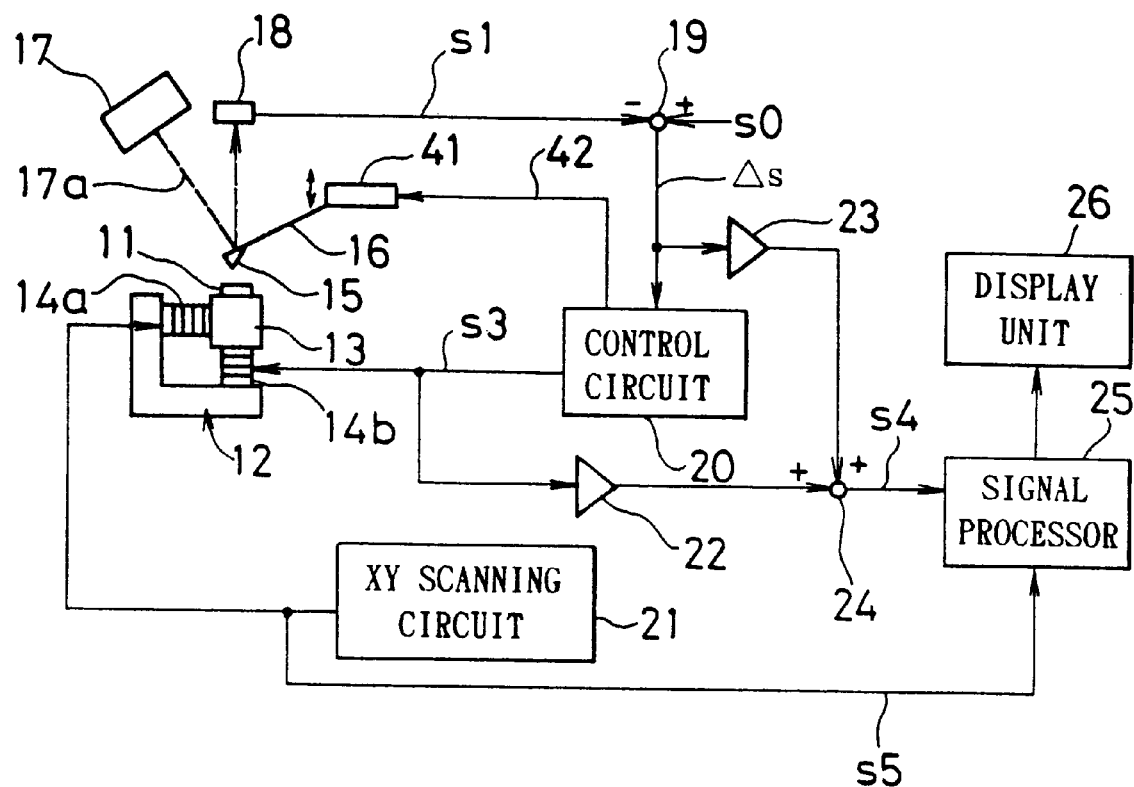
FIG. 11 is a block diagram showing a configuration of a processing apparatus.

FIG. 11 shows one example of a processing apparatus. This processing apparatus is configured by utilizing the SPM shown in FIG. 1. Elements shown in FIG. 11, which are the substantially the same as those shown in FIG. 1 are represented by the same reference numerals. This processing apparatus forms indentations on a sample surface by pressing the probe 15 to the sample surface. Besides, there is another configuration that electric pulses are supplied to the probe so that the probe electrically forms the indentations on the sample surface. A processing actuator 41 is added to the SPM shown in FIG. 1 and an operation of the processing actuator 41 is controlled by the control circuit 20 as indicated by an arrow 42. The processing actuator 41 moves the cantilever 16 vertically at a fast speed. A piezoelectric element composed of a single thin plate is generally used as the processing actuator 41.

Figure 12:
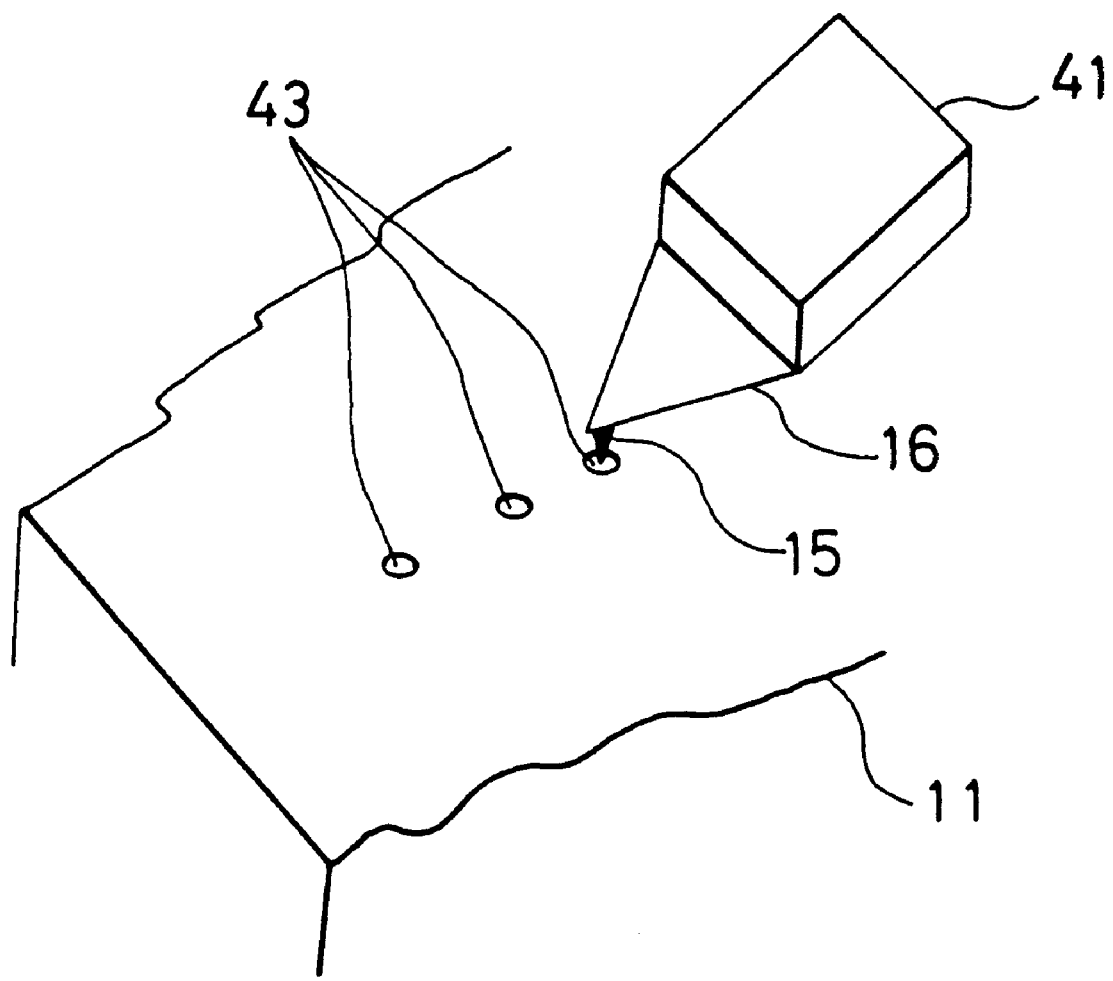
FIG. 12 is a perspective view showing an appearance of a processing condition.
Figure 13:
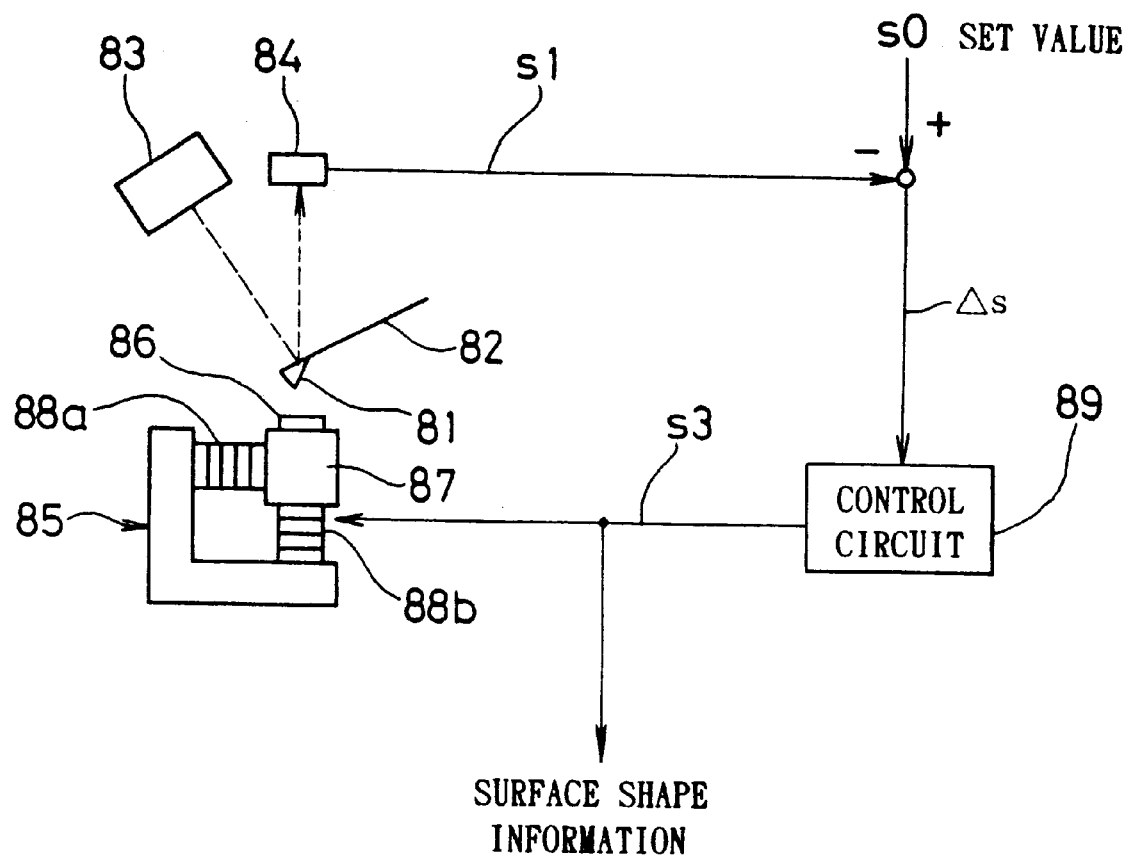
FIG. 13 is a block diagram showing a configuration of a conventional SPM.

The processing apparatus having the above-mentioned configuration performs a processing operation as illustrated in FIG. 12. The probe 15 forms indentations 43 on the surface of the sample 11. In order to perform the work, it is important to move the probe 15 so as to follow the sample surface, to form the indentations 43 at predetermined points, and to monitor whether or not the indentations are formed on real time.

The processing apparatus described above can not only perform control in the conventional mode but also permits directly measuring operations of the cantilever 16 and worked surfaces on real time.

What is claimed is:

1. A scanning probe microscope comprising a probe supported by a deformable member so as to be opposed to a sample, a means for changing a relative positional relationship between said sample and said probe, and a detecting means for detecting a force acting on said probe due to a physical variable produced between said probe and said sample, further comprising;

a control means for maintaining a state variable related to said force acting on said probe at a set value, and an adding means for adding a control signal obtained from said control means and a signal based on a deviation between said state variable of said probe and said set value, wherein information on a surface of said sample is obtained from a signal outputted from said adding means.

2. A scanning probe microscope according to claim 1, wherein said deformable member is a cantilever, at tip of which said probe is disposed, and flexural deformation of said cantilever is utilized for detecting said force acting on said probe.

3. A scanning probe microscope according to claim 2, wherein said physical variable is an atomic force between said probe and the surface of said sample.

4. A scanning probe microscope according to claim 2, wherein a set value corresponding to a force of pressing said probe against said sample is set in advance, said adding means adds a control signal from said control means for controlling a distance between said cantilever and said sample to cause the force to be constant, and a signal based on a deviation between displacement of said cantilever and said set value, and said information on the surface of said sample is obtained from a signal outputted from said adding means.

5. A scanning probe microscope according to claim 1, further comprising a switching means for setting a control function of said control means in an on condition or an off condition wherein the information on the surface of said sample is obtained only from the signal based on the deviation when the control function of said control means is set in the off condition by said switching means.

6. A scanning probe microscope according to claim 5, further comprising another switching means for setting a function of adding the signal based on the deviation to the control signal in an on condition or an off condition wherein the information on the surface of said sample is obtained from both or either of the signal based on the deviation and the control signal by operating said switching means and another switching means selectively.

7. A scanning probe microscope according to claim 1, further comprising a switching means for setting a function of adding the signal based on the deviation to the control signal in an on condition or an off condition wherein the information on the surface of said sample is obtained only from the control signal when the adding function is set in the off condition by said switching means.

8. A scanning probe microscope according to claim 1, further comprising a displacement meter for measuring a displacement produced by said means for changing the relative positional relationship, and wherein a signal outputted from said displacement meter is used in place of the control signal.

9. A scanning probe microscope according to claim 1, wherein the information on the surface of said sample is information on a structure of the surface.

10. A scanning probe microscope according to claim 1, wherein said means for changing a relative positional relationship between said probe and said sample is set in a contact mode when measuring said sample.

11. A scanning probe microscope according to claim 1, wherein said means for chancing a relative positional relationship between said probe and said sample is set in a tapping mode when measuring said sample.

12. A scanning probe microscope according to claim 1, wherein said means for changing a relative positional relationship between said probe and said sample is set in a non-contact mode when measuring said sample.

13. A processing apparatus comprising;

a scanning probe microscope having a probe supported by a deformable member so as to be opposed to a sample, a means for changing a relative positional relationship between said sample and said probe, a detecting means for detecting a force acting on said probe due to a physical variable produced between said probe and said sample, a control means for maintaining a state variable related to said force acting on said probe at a set value, and an adding means for adding a control signal obtained from said control means and a signal based on a deviation between said state variable of said probe and said set value, wherein said sample is processed and operated by said probe.

14. A processing apparatus according to claim 13, further comprising a processing actuator for actuating said deformable member, and a control means for controlling said processing actuator.

15. A processing apparatus according to claim 13, wherein indentations are formed on the surface of said sample by said probe.

16. A scanning probe microscope, comprising:

a probe supported by a cantilever at a tip thereof so as to be opposed to a sample, means for changing a relative positional relationship between said probe and said sample, detecting means for detecting a force acting on said probe due to a physical variable produced between said probe and said sample, control means for controlling said changing means to maintain a state variable related to said force acting on said probe at a set value, a displacement meter for measuring displacement in a Z-axis direction produced by said means for changing the relative positional relationship, and adding means for adding a signal outputted from said displacement meter and a signal based on a deviation between said state variable of said probe and said set value, wherein information on a surface of said sample is obtained from a signal outputted from said adding means.

17. A scanning probe microscope according to claim 16, wherein said physical variable is atomic force between said probe and the surface of said sample.

18. A scanning probe microscope according to claim 17, wherein:

said set value corresponding to force of pressing said probe against said sample is set in advance, and said adding means adds the signal outputted from said displacement meter and the signal based on the deviation between the displacement of said cantilever and said set value.

19. A scanning probe microscope according to claim 16, wherein:

said set value corresponding to force of pressing said probe against said sample is set in advance, and said adding means adds the signal outputted from said displacement meter and the signal based on the deviation between the displacement of said cantilever and said set value.

20. A scanning probe microscope comprising:

a probe supported by a cantilever at a tip thereof so as to be opposed to s sample, means for changing a relative positional relationship between said sample and said probe, detecting means for detecting force acting on said probe due to a physical variable produced between said probe and said sample, control means for controlling said changing means to maintain a state variable related to said force acting on said probe at a set value, adding means for adding a control signal obtained from said control means and a signal based on a deviation between said state variable of said probe and said set value, first means for switching on or off supply of the control signal from said control means to both of said changing means and said adding means, and second means for switching on or off supply of the deviation signal to said adding means, wherein, when switching both of said first and second switching means on, information on a surface of said sample is obtained from a signal outputted from said adding means, when switching said first switching means off and said second switching means on, the surface information is obtained from the deviation signal outputted from said adding means, and when switching said first switching means on and said second switching means off, the surface information is obtained from the control signal outputted from said adding means.

21. A scanning probe microscope according to claim 20, wherein said physical variable is atomic force between said probe and the surface of said sample.

22. A scanning probe microscope according to claim 21, wherein:

said set value corresponding to a force of pressing said probe against said sample is set in advance, said adding means adds the control signal outputted from said control means, and a signal based on a deviation between displacement of said probe and said set value.

23. A scanning probe microscope according to claim 20, wherein:

said set value corresponding to a force of pressing said probe against said sample is set in advance, said adding means adds the control signal outputted from said control means, and a signal based on a deviation between displacement of said probe and said set value.

24. A scanning probe microscope according to claim 20, wherein the information on the surface of said sample is information on a structure of the surface.

25. A scanning probe microscope according to claim 20, wherein said means for changing a relative positional relationship between said probe and same sample is set in a contact mode when measuring said sample.

26. A scanning probe microscope according to claim 20, wherein said means for changing a relative positional relationship between said probe and said sample is set in a tapping mode when measuring said sample.

27. A scanning probe microscope according to claim 20, wherein said means for changing a relative positional relationship between said probe and said sample is set in a non-contact mode when measuring said sample.

* * * * *